Patented Oct. 15, 1935

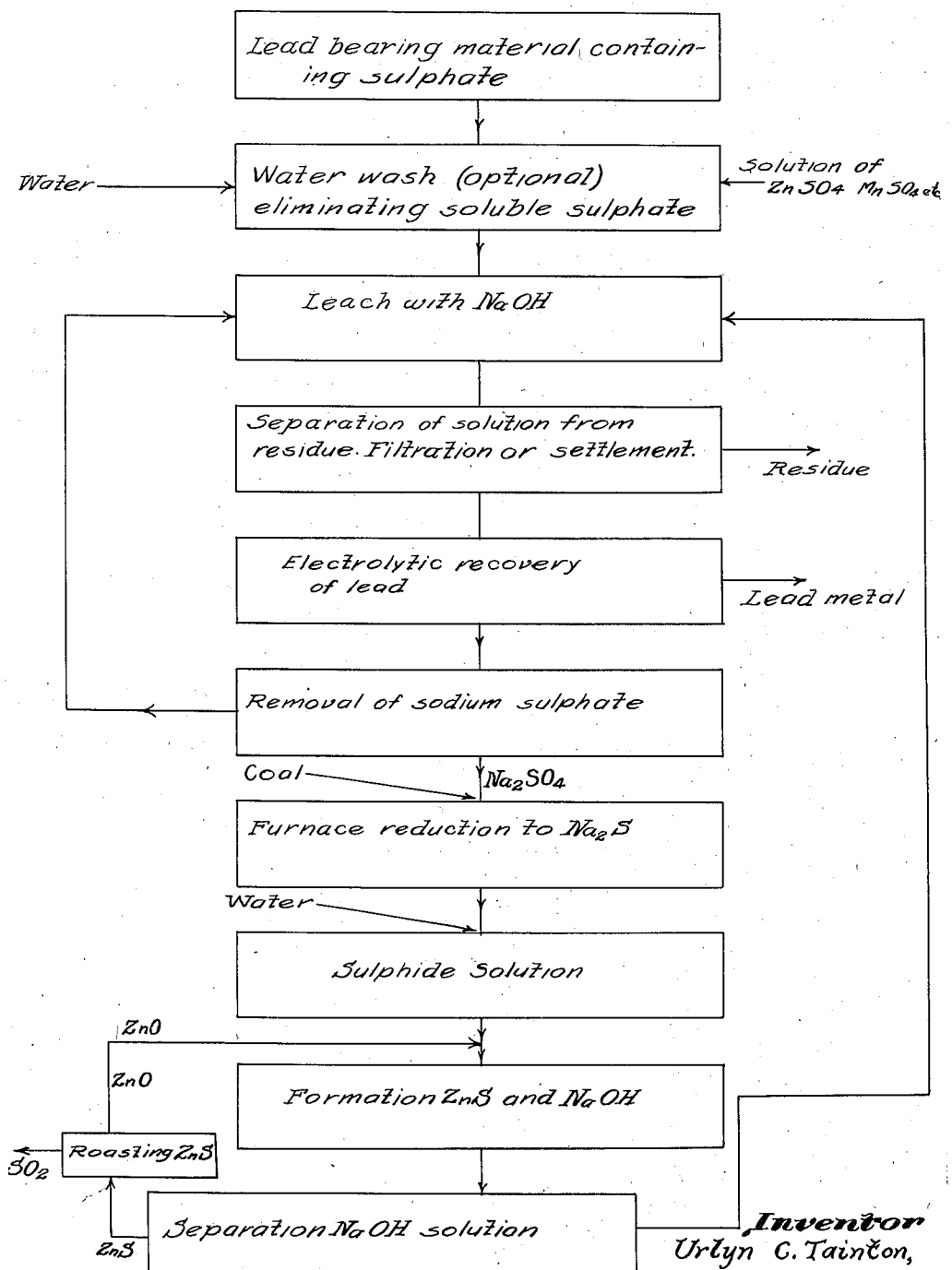

2,017,612

UNITED STATES PATENT OFFICE 2,017,612

**IMPROVEMENTS IN HYDROMETALLURGI-
CAL RECOVERY OF LEAD FROM ORES
AND OTHER LEAD BEARING MATERIALS**

Urlyn C. Tainton, St. Louis, Mo.

Application November 22, 1929, Serial No. 409,184

6 Claims. (Cl. 204—15)

Oxidized or roasted lead ores and many other lead bearing materials contain a certain quantity of sulphate. When such materials are leached with an alkaline hydroxide solution the lead is dissolved and with it a part or all of the contained sulphate. The sodium sulphate formed, if allowed to accumulate beyond a certain point in the solution, impairs the efficiency of the process as fully described in my co-pending application entitled "Method for recovery of lead and other metals from ores or other lead bearing materials" filed September 19th, 1927, Serial Number 220,358, of which the present application is a continuation in part thereof.

The present invention relates to methods of removing the sodium sulphate and converting it back to caustic soda so that it can be used again in the leaching operation and the invention is diagrammatically illustrated in the accompanying drawing.

According to the present invention, this is accomplished by permitting the sodium sulphate to reach a substantial concentration in the solution and then subjecting this solution to cooling or evaporation whereby the sodium sulphate is recovered in crystal form, either with or without other salts. The sodium sulphate is then subjected to reducing action at a high temperature whereby the oxygen is abstracted and it is converted to sodium sulphide. This sodium sulphide is then dissolved in water and treated with the oxide of a metal of which the sulphide is not soluble in caustic soda. Zinc, copper, and manganese are examples of such metals. By this treatment, the sodium sulphide reacts with the metal oxide forming sodium hydroxide and the sulphide of the metal in question.

The metal sulphide is then separated from the solution by filtration or otherwise and may be heated in the presence of air to convert it back to the oxide for re-use in the process. The sulphur dioxide gas evolved may be obtained in concentrated form for use in the manufacture of sulphuric acid or otherwise. The caustic soda solution, after separation from the metallic sulphide, may be returned directly to the leaching circuit for the treatment of fresh material. By working in this way the solution may be maintained in a condition of undiminished efficiency and the sulphur content of the lead-bearing material may be turned to practical advantage. In illustration of the mode of carrying this invention into effect; ore containing lead in the form of sulphide is first ground sufficiently fine to expose the lead mineral and is then subjected to a roasting treatment whereby the sulphide is oxidized to sulphate and oxide. It is frequently of advantage at this point to add a small amount of common salt during the roasting operation to the extent of one or two per cent of the weight of the ore. The roasted ore is then leached with a solution containing alkaline hydroxides, either with or without a preliminary water wash to remove water-soluble sulphates. The lead dissolves in the solution as sodium plumbite and the sulphate combines with the caustic soda to form sodium sulphate. The solution is then separated from the undissolved part of the ore and the lead and other metals recovered by electrolysis or otherwise. The solution, after depletion of its metal values, is returned to the leaching operation for the treatment of a fresh batch of calcine.

As this operation is continued, the solution builds up in sulphate content and the sodium sulphate is accordingly removed either intermittently or continuously by subjecting the solution to a low temperature whereby sodium sulphate separates out, leaving the caustic soda in solution. Alternatively, a part of the solution may be withdrawn and the water removed by evaporation according to known means. The sodium sulphate so recovered is then heated in a furnace in the presence of carbon or other reducing substances whereby it is converted into sulphide. For this purpose we prefer to employ a stationary shaft furnace lined with soapstone and having water-cooled tuyères of the type used in the "sulphate" process for the production of paper. Any other standard type of furnace may, however, be used. In the case of the shaft furnace, the molten sodium sulphide flows out from the furnace and is allowed to drop into a tank of water where it dissolves. The solution is then allowed to settle and is transferred to another tank where it is treated with zinc oxide, derived from a later stage in the process. A reaction occurs whereby zinc sulphide is precipitated and caustic soda is formed. A preferred concentration of sodium sulphide is one that will give about ten to twenty per cent of caustic soda in the resultant solution. This solution is then separated by settlement or filtration according to standard methods and the zinc sulphide is then heated in a furnace, preferably of the rotary type, to a temperature of about 500° C. At this temperature combustion begins and the sulphur is eliminated as $SO_2$ which may be employed in the production of acid or otherwise. The zinc oxide is then returned for re-use in the conversion step.

Having thus described my invention, what I claim and desire to secure by Leters Patent is—

1. In the electrolytic extraction of lead from lead bearing material containing sulphate by means of an alkaline solution, the cyclic method which comprises leaching of the lead bearing material with a caustic alkaline solution, removing lead from the leaching solution, thereafter removing alkaline sulphate from the leaching solution, converting the said alkaline sulphate from the leaching solution by heat treatment into an alkaline sulphide, causing the sulphide to combine with a metal oxide to form a metallic sulphide and caustic alkali employing the caustic alkali thus produced so as to maintain the solution alkaline for leaching incoming lead or fresh lead bearing material, converting the metallic sulphide thus obtained into metallic oxide and using the metal oxide for the oxidation of the alkaline sulphide.

2. In the electrolytic extraction of lead from lead bearing material containing sulphate by means of an alkaline solution the cyclic method which comprises leaching successive batches of the lead bearing material with an alkaline solution, separating or removing from the leaching solution lead obtained therein as the result of the leaching operation, thereafter regenerating the solution by removing the sulphate from the solution as it accumulates therein, reducing the sulphate by heat treatment to form sulphide and causing the sulphide to combine with zinc oxide to form zinc sulphide and caustic alkali, returning the caustic alkali to the leaching solution for use in leaching a fresh or incoming batch of lead bearing material, and converting the zinc sulphide into zinc oxide for reuse in the cyclic process.

3. In the electrolytic extraction of lead from lead bearing material containing sulphate the cyclic process which comprises the leaching of the lead bearing material by means of an alkaline leaching solution, the recovery of lead by electrolytic precipitation from the solution resulting as the result of said leaching operation, thereafter removing some of the sulphate content from the solution as it accumulates, reducing the removed sulphate by heat treatment to form a sulphide, causing the sulphide to combine with zinc oxide to form zinc sulphide and caustic alkali, returning the caustic alkali to the alkali leaching solution whereby the caustic alkali thus returned assist in maintaining the proper alkalinity in the leaching solution, and subjecting the zinc sulphide to heat and oxidation to drive off sulphur dioxide and so as to form zinc oxide required for use in the process.

4. A method of recovering metallic lead from roasted ores containing oxides and sulphates which method consists in leaching the roasted ores in a solution containing alkaline hydroxide to dissolve the lead as an alkali plumbite, separating the solution from the residue, electrolyzing said solution with insoluble anodes to precipitate metallic lead, subjecting the solution to a sufficiently low temperature to deposit sodium sulphate, removing the sodium sulphate, employing the solution thus obtained for leaching a fresh charge of ore, reducing the removed sodium sulphate to sulphide, employing a metallic oxide for causing the sodium sulphide to react therewith in order to form a sodium hydroxide and metallic sulphide, separating the sodium hydroxide from the metallic sulphide, returning the separated sodium hydroxide to the solution for reuse as an essential leaching providing agent, roasting the metallic sulphide thus derived to form the metallic oxide and subsequently using the metallic oxide in the process for effecting the conversion of the sodium sulphide into the sodium hydroxide.

5. In the electrolytic extraction of lead from lead-bearing materials containing sulphate by a cyclic process, the method comprising leaching the lead-bearing materials that include lead sulphates with an alkaline hydroxide solution thus forming alkali plumbite and alkali sulphate, electrolyzing the solution to precipitate metallic lead, separating any substantial excess of the alkali from the solution as such excess accumulates, reducing the removed sulphate to sulphide, supplying a metallic oxide derived in carrying out the process and causing the alkali sulphide thus formed to react with the metallic oxide thus supplied to form an alkali-hydroxide and metallic sulphide, separating the alkali-hydroxide from the metallic sulphide and returning the separated hydroxide solution for reuse in the process as a leaching agent for fresh or incoming lead-bearing material that includes lead sulphates, roasting the metal sulphide thus derived to form the metallic oxide subsequently using the metallic oxide in effecting the conversion of the alkali sulphide into the alkali-hydroxide.

6. A method as defined in and by the claim last preceding in which method the metallic sulphide referred to therein as being left as the result of treating the alkaline solution is a zinc sulphide and is roasted to form zinc oxide suitable for reuse in the process and sulphur dioxide suitable for other use.

URLYN C. TAINTON.